(12) United States Patent
O'Neil et al.

(10) Patent No.: US 11,698,158 B2
(45) Date of Patent: Jul. 11, 2023

(54) CAP FOR RISERS IN CONCRETE DECKS

(71) Applicant: Reliance Worldwide Corporation, Atlanta, GA (US)

(72) Inventors: Virgil O'Neil, Poway, CA (US); Dennis L. Hart, Poway, CA (US); Randy Borman, Poway, CA (US); Ryan Miller, Poway, CA (US); James W. Cosley, Poway, CA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 0 days.

(21) Appl. No.: 17/574,264

(22) Filed: Jan. 12, 2022

(65) Prior Publication Data

US 2022/0186870 A1    Jun. 16, 2022

Related U.S. Application Data

(63) Continuation of application No. 16/577,976, filed on Sep. 20, 2019, now Pat. No. 11,255,477.

(60) Provisional application No. 62/735,644, filed on Sep. 24, 2018.

(51) Int. Cl.
*F16L 55/115* (2006.01)

(52) U.S. Cl.
CPC ................... *F16L 55/115* (2013.01)

(58) Field of Classification Search
CPC ... F16L 55/115; F16L 55/1286; F16L 57/005; E04G 15/063
See application file for complete search history.

(56) References Cited

U.S. PATENT DOCUMENTS

| | | | |
|---|---|---|---|
| 1,941,235 A | 12/1933 | Unke | |
| 2,073,389 A * | 3/1937 | Engstrom | B65D 59/00 138/96 T |
| 2,212,974 A | 8/1940 | Bateman | |
| 2,251,897 A | 8/1941 | Severn | |
| 2,989,087 A | 6/1961 | Higgins | |
| 3,081,102 A | 3/1963 | Murray et al. | |
| 3,800,486 A | 4/1974 | Harvey | |
| 3,802,466 A * | 4/1974 | Panella | F16L 55/115 277/615 |
| 4,020,873 A | 5/1977 | Palarino | |
| 4,157,100 A | 6/1979 | Turk | |
| 4,492,666 A | 1/1985 | Dreyfuss et al. | |
| 4,823,527 A | 4/1989 | Harbeke | |
| 5,038,829 A | 8/1991 | Panella | |
| 5,190,320 A | 3/1993 | Hodges | |
| 5,347,786 A | 9/1994 | Hodges | |

(Continued)

*Primary Examiner* — Andrew J Triggs
(74) *Attorney, Agent, or Firm* — Barnes & Thornburg LLP

(57) ABSTRACT

An assembly creates annular voids in concrete around the distal end of cylindrical tubes. A cap has a flat top and a cylindrical, depending skirt. An annular, foam plug extends between the inside of the skirt and the outer diameter of the tube. The plug has an undeformed inner diameter smaller than an outer diameter of the tube to create an interference fit around the tube and keep concrete out when the cap is on the end of the tube. The plug has a radial thickness of 0.3 to 1 inch, and has an axial length of 1 to 3 inches, with a bottom of the plug located at a bottom of the skirt. The cap is glued to the end of the tube for pressure testing. After the tube is entrained in concrete, the cap and plug are removed to leave a void in the concrete surface.

17 Claims, 2 Drawing Sheets

(56) References Cited

U.S. PATENT DOCUMENTS

| | | | |
|---|---|---|---|
| 5,452,749 A * | 9/1995 | Johnson | B65D 59/06 |
| | | | 138/96 T |
| 5,996,134 A | 12/1999 | Senninger | |
| 6,101,774 A | 8/2000 | Heil | |
| 6,349,975 B1 | 2/2002 | Heil | |
| 7,484,533 B1 | 2/2009 | Arndt | |
| 7,762,282 B2 | 7/2010 | Coscarella | |
| 9,086,174 B2 | 7/2015 | McConnell et al. | |
| 9,103,116 B2 | 8/2015 | McConnell et al. | |
| 9,631,761 B1 | 4/2017 | Arthurs et al. | |
| 11,255,477 B2 * | 2/2022 | O'Neil | E04G 21/185 |
| 2018/0231146 A1 | 8/2018 | O'Neil et al. | |
| 2020/0096149 A1 * | 3/2020 | O'Neil | F16L 55/115 |
| 2022/0186870 A1 * | 6/2022 | O'Neil | E04G 21/185 |

* cited by examiner

CAP FOR RISERS IN CONCRETE DECKS

CROSS-REFERENCE TO RELATED APPLICATIONS

This application is a continuation of U.S. patent application Ser. No. 16/577,976, filed Sep. 20, 2019, now U.S. Pat. No. 11,255,477, the entire contents of which are incorporated herein by reference. U.S. patent application Ser. No. 16/577,976 claims the benefit under 35 U.S.C. § 119(e) to Provisional Patent Application No. 62/735,644, filed Sep. 24, 2018, the entire contents of which are incorporated herein by reference.

STATEMENT RE: FEDERALLY SPONSORED RESEARCH/DEVELOPMENT

Not Applicable

BACKGROUND

Pipes are embedded in concrete floors and walls by passing the pipe through at least one concrete form, pouring and then finishing the concrete before it hardens. If the pipe must be mounted to a flange flush with the concrete surface, as occurs with a closet flange, then the pipe must be cut off and the concrete around the pipe chipped out manually so a depending skirt on the closet flange can fit around the outside of the pipe.

Sometimes, riser pipes are used to form passages through the concrete. A cap placed over the distal end of the riser pipe is used to keep the concrete out of the pipe during concrete pouring and finishing. While a fitting can sometimes be attached to the inside of the pipe after the concrete is finished and hardened, it is sometimes desirable to have pipe connections occur on the outside of the pipe instead of inside the pipe and when that occurs the concrete around the pipe is again chipped out manually to create the needed space.

Prior devices pass the pipes through hollow boxes to create a cavity around the tops of the pipes. But the boxes are expensive to create, cumbersome to align and install, and difficult to use. There is thus a need for an improved method and apparatus to create a void space around the top of a pipe or sleeve for a poured concrete surface.

BRIEF SUMMARY

An assembly is provided to create an annular void in a concrete surface around the distal end of cylindrical tubes such as pipes or risers. A cap with a flat top has a cylindrical, depending skirt. An annular, foam plug, preferably of polyethylene, is fastened inside the skirt and extends between the skirt and an outer diameter of the tube over which the cap is placed. The plug has an undeformed inner diameter that is smaller than an outer diameter of the tube to create an interference fit around the tube and keep concrete out when the plug fits over the distal end of the tube. The plug has a radial thickness of 0.3 to 1 inch, and has an axial length of 1 to 3 inches, with a bottom of the plug located at a bottom of the skirt. After the tube is entrained in concrete, the cap and plug are removed to leave a void in the concrete surface. The cap can be glued to the end of the tube for pressure testing, and pushed out from the bottom of the tube by passing a smaller pipe through the tube to break the adhesive and any concrete covering the cap.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Figure 1:
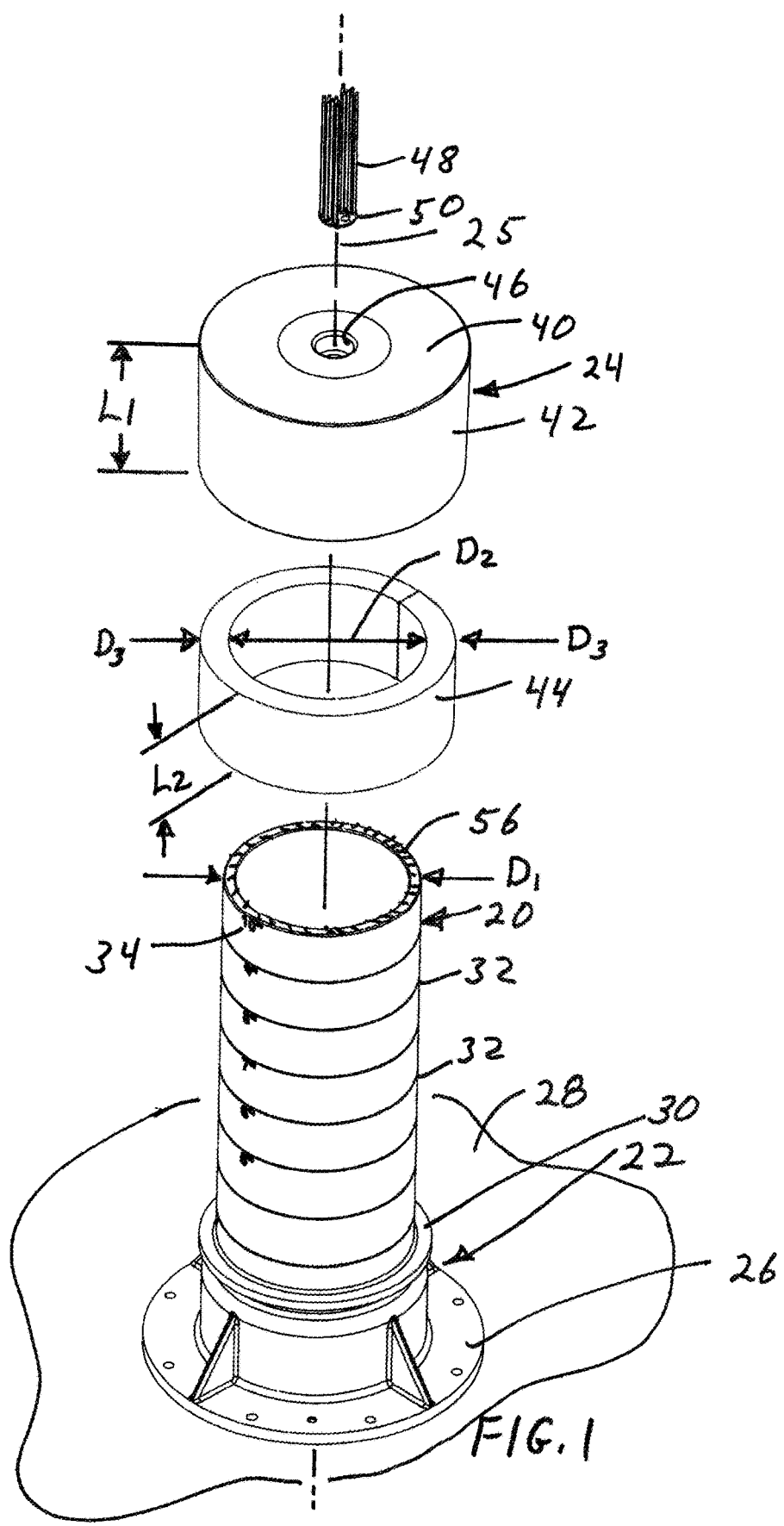
FIG. 1 is an exploded perspective view of a riser with a cap.
Figure 3:
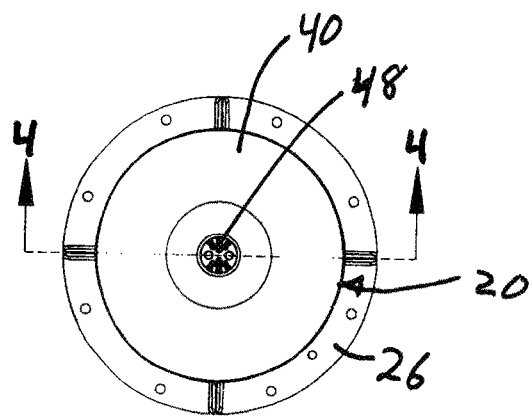
FIG. 3 is a top view of the assembled riser and cap of FIG. 2.
Figure 2:
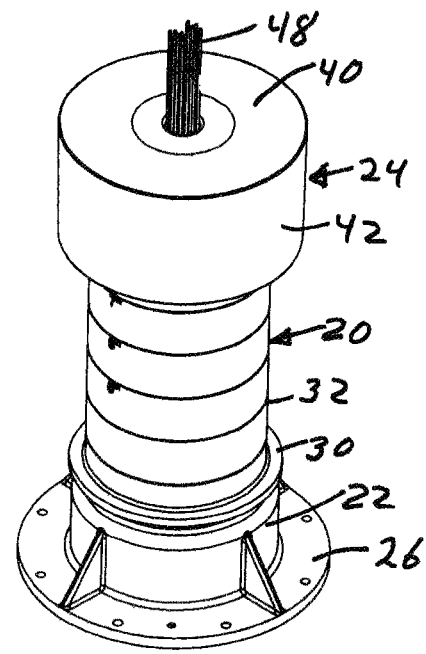
FIG. 2 is a perspective view of the riser and cap of FIG. 1 in an assembled configuration.
Figure 4:
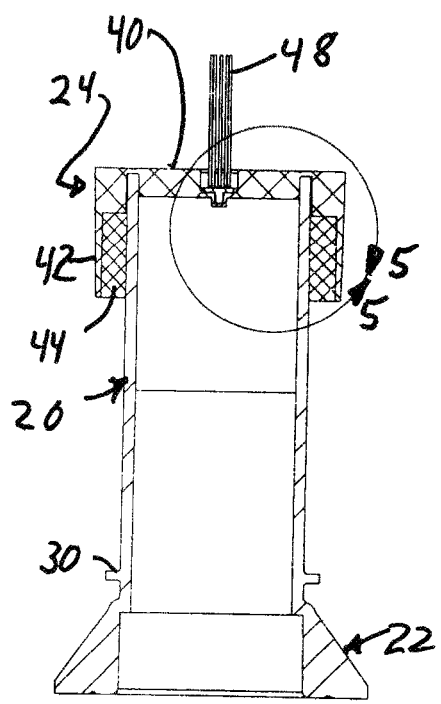
FIG. 4 is a sectional view of the assembled riser and cap of FIG. 2 taken along 4-4 of FIG. 3.

As used herein, the relative terms inward and outward refer to directions or relative positions toward and away from a longitudinal axis 25. The relative terms top and bottom, up and down, etc. are along the direction of gravity when the product is on a horizontal surface with a tubular riser 20 extending upward. The lateral or radial directions or relative positions refer to directions or positions perpendicular to the longitudinal axis 25.

Referring to FIGS. 1-5, the tubular riser 20 has a base 22 at a first, bottom end and an open top at a second, opposing end, which open top is covered by a cap 24. The riser 20 advantageously comprises a cylindrical tube with an outer diameter D1, made of plastic and extending along the longitudinal axis 25. But other cross-sectional shapes may be used other than circular. The base 22 advantageously has a radially extending base flange 26 with preformed holes through which fasteners may extend to fasten the base flange to a concrete form 28, which creates one surface of the concrete slab or deck when the concrete is hardened. One or more optional embedding flanges 30 may extend outward from the base 22 of the riser 20 to better embed the riser in the concrete. A series of optional circumferential grooves 32 encircle the riser 20 and are formed in the outer surface of the riser. The grooves 32 are advantageously spaced predetermined distances from the bottom of the base flange 26 and provided with printed indicia 34 to identify different distances from the bottom of the base flange 26. A user can cut the riser 20 to length by cutting at one of the grooves 32. The printed indicia 34 advantageously reflects the height of the riser 20 and the cap 24 from the concrete form 28. The bottom of the base 22 advantageously has the interior of the base or riser 20 configured to receive a pipe, such as a female coupling to receive a male pipe coupling, or possibly part of a threaded coupling. The riser 20, the base 22, the base flange 26, the embedding flange 30, the grooves 32, and printed indicia 24 are advantageously injection molded of a suitable plastic, such as ABS, PVC, or other plastic suitable for the intended use.

The riser 20 may comprise the distal end of a plastic or metal pipe, and as used herein and unless specified otherwise, the term "riser" is used to refer to both a tubular riser fitting, or the end of a pipe.

The cap 24 has a top plate 40 with a skirt 42 depending toward the bottom of the riser 20 and generally parallel to and encircling the longitudinal axis 25. The outer periphery of the cap 24 and its skirt 42 are both larger in cross-sectional size or diameter than the riser 20 so the skirt 24 is spaced outward of the axis 25. The skirt 42 has a smooth outer surface so it does not stick well to the concrete, and the cap 24 is preferably made of a material or coated with a material that does not stick well to concrete so the cap 24 and concrete can be separated from hardened concrete after being embedded in wet concrete. A plug 44 is fastened to the cap 24 and fills the space between the skirt 42 and the outside of the cylindrical riser 20. The shape of the riser 20, the skirt 42, and the plug 44 in a plane orthogonal to the axis 25 are preferably the same and are each preferably circular. The plug 44 is thus ring shaped or annular shaped. Advantageously, the plug 44 has a radial thickness slightly greater than the distance between the outer surface of the riser 20 and the inner surface of the skirt 42 so the plug has to be squeezed or compressed to be manually slid over the end of the riser. The plug 44 has an inner diameter D2 that is slightly less than the outer diameter D1 of the riser 20. The plug 44 optionally has an outer diameter D3 slightly greater than the inner diameter of the skirt 42. The plug 44 has an axial length L2 that preferably corresponds to the hollow area radially inward of the skirt 42 and below the top plate 40 that extends beyond the riser 20 when the cap 24 is on the riser 20.

The cap 24 advantageously has a recess 46 at the center of the cap 24 and on the longitudinal axis 25. One or more flexible whiskers 48 are connected to a base 50 which is configured to connect to the recess 46. In the depicted embodiment, the base 50 is a stepped cylindrical base having two cylinders, at least one of which is friction-fit into a two-stepped recess 46. The whiskers 48 and preferably the base 50 are of silicon or other flexible material.

The cap 24 may have a cup shaped configuration with the top plate 40 and the skirt 42 of the same thickness for ease of molding of plastic such as ABS, PVC, polyethylene, or other suitable polymer material. The depicted cap 24 has a plurality of inner stiffeners 52 extending radially outward from the center of the cap 24 with the inner stiffeners 52 ending just before they would hit the riser 20 when the cap 24 is placed on the riser 20.

A plurality of outer stiffeners 54 extend from the top of the skirt 42, radially inward toward the center of the cap 24 and end just before they would hit the riser 20 when the cap is placed on the riser. The gap between the radial ends of the inner and outer stiffeners 52, 54 is large enough to allow the cap 24 to be manually placed on the open end of the riser 20 until the top edge of the riser 20 hits the bottom of the top plate 40 of the cap 24. The radial length of the outer stiffeners 54 ends before hitting the top side of the riser 20. The inner and outer stiffeners 52, 54 advantageously leave a radial gap between them of 0.05 to 0.1 inch larger than the radial thickness of the riser 20, and that gap is located on the inner surface of the cap 24 so the cap 24 can be manually placed over the top of the riser 20.

The axial length of each of the outer stiffeners 54 is preferably the same as the axial length of the inner stiffeners 52 or within two or three times that axial length. Advantageously, the axial length of the plug 44 extends for a majority of an axial length L1 of the skirt 42 and more preferably extends along 80% to 90% of the axial length of the skirt 42.

The plug 44 is advantageously sized to create a slight interference fit with the top of the riser 20. An interference fit of about 0.05 inches is believed suitable, but will depend on the compressibility of the material used for the plug 44. The plug 44 is advantageously made of a compressible material as the cap 24 and the plug 44 can be manually fit onto the open end of the riser 20 and pressed downward until the top of the riser 20 rests against the top plate 40. Thus, the plug 44 is advantageously sized so its inner diameter D2 is slightly smaller than the outer diameter D1 of the top of the riser 20. The plug 44 is advantageously made of a foam material, with closed cell foam preferred, but open cell foam is believed suitable but not preferred. Foam pipe insulation having an inner diameter slightly larger than the outer diameter of the riser 20 (or pipe 20) is believed suitable for the plug 44. Polyethylene is believed a suitable material for the plug 44, and tubular polyethylene pipe insulation is believed suitable for forming ring-shaped plugs 44. An interference fit of about 0.05 inches is believed suitable when foam pipe insulation is used for the plug 44. Advantageously, an elongated tube of pipe insulation may be cut perpendicular to or orthogonal to the longitudinal axis 25 of the elongated tube to form rings having a generally rectangular cross-section that may be used for the plug 44. As such, the plug has an inner cylindrical surface and an opposing outer cylindrical surface, and the inner and outer cylindrical surfaces are straight along the axial length L2 of the plug 44.

The outer diameter or periphery of the plug 44 and of the skirt 42 are selected to create a void in the concrete surface large enough to achieve the intended use of that void space. A radial thickness of the plug 44 and the skirt 42 of 0.3 inches to 1 inch is believed suitable for most applications, with a radial thickness of 0.4 to 0.6 inches believed more advantageous while an axial thickness of 0.5 inches is preferred for most applications. The plug 44 advantageously has an axial length of one or 1.2 inches to 3 inches, with the smaller length typically used for pipes with smaller diameters of 3 to 4 inches (e.g., small drains and small closet flanges), and the longer lengths used for larger diameter pipes of 4 to 6 inches (e.g., larger drains). As the closet flanges and other plumbing fittings have cylindrical skirts of varying length, the axial length L2 of the plug 44 is preferably selected to be 0.3 to 0.5 inches greater than the axial length L1 of the skirt 42 on the plumbing fixture that is to be used with the void formed by the plug 44.

Figure 5:
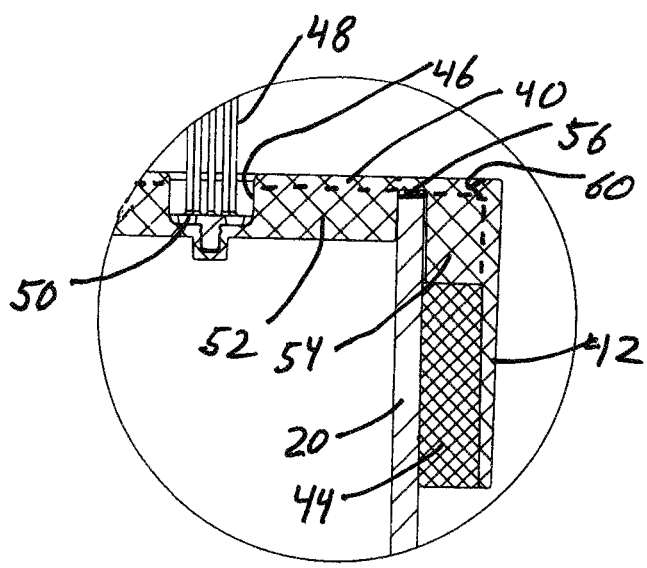
FIG. 5 is an enlarged sectional view taken along 5-5 of FIG. 4.

As seen in FIG. 5, an adhesive 56 may optionally be placed on the top edge of the riser 20 and around the entire periphery of the riser 20, in the gap between the ends of the inner and outer stiffeners 54, 54. The adhesive 56 is selected to provide a fluid tight seal suitable for pressure testing the riser 20. Pressure tests are usually performed at 5 psi air pressure or 5 to 25 psi water pressure. An ABS adhesive is believed suitable.

The top plate 40 of the cap 24 is preferably parallel to the finished concrete surface. To achieve this, the top end of the riser 20 is preferably square, meaning it is orthogonal to the axis 25, so that the cap 24 is perpendicular to the axis 25, which normally puts the top plate 40 horizontal and parallel to the concrete surface. But some variation occurs in practice as things get moved during construction and as concrete is poured, and as measurements are not perfect. A variation in the inclination of the top end of the riser 20 resulting in a maximum inclination of plus or minus 3° from the axis 25 to the laterally outer or peripheral edge of the top plate 40 is believed suitable for most applications.

In use, the riser 20 is cut to length at the grooves 32 and the base flange 26 is fastened to concrete form 28 at the desired location. The form 28 is typically a sheet of plywood or a corrugated metal sheet or flattened and packed earth. If the riser 20 is a pipe end, the pipes are typically pre-placed and connected to the form or corrugated metal or packed earth using known methods that do not involve the base flange 26 as that is absent. But the tubular pipe is sufficiently similar to the tubular riser 20 that the pipe may be used in place of the riser 20 given the present disclosure. The plug 44 is selected for the appropriate void space and riser 20 and then the cap 24 and plug are placed on the riser 20 (or pipe) and pressed downward until the top of the riser 20 (or pipe) hits the top plate 40. The top of the concrete surface is typically at or slightly above the top surface of the cap 24 so it is usually important to position the cap 24 against the top of the riser 20 or pipe to prevent the cap 24 from sticking above the finished concrete surface and being damaged by the concrete finishing equipment. The whiskers 48 are placed in the recess 46 shortly before concrete is poured to prevent unplanned removal. If a pressure test is to be performed on the riser, then adhesive 56 is placed around the entire top edge of the riser so the cap 24 is adhered to the riser and forms a fluid tight seal suitable for pressure testing. The adhesive 56 keeps the cap 24 on the riser 20. If an adhesive 56 is not used, the slight interference fit between the plug 44 and the riser 20 (or pipe) retains the cap 24 on the riser 20.

When the construction has progressed sufficiently, and any pressure tests are completed, the whiskers 48 are placed in the recess 46 (if not already done) and the cap 24 may be checked to ensure the cap 24 abuts the top of the riser 20 or pipe. The concrete is then poured around the riser 20 (or pipe) to embed the assembly in concrete and preferably cover the cap 24 with a thin layer of concrete. The whiskers 48 are flexible and bend with the concrete finishing equipment, such as trowels or power trowels to allow surface finishing of the concrete while projecting above the finished surface enough to identify the location of the cap 24 and the riser 20.

After the concrete is finished and hardened, the cap 24 is located by identifying the whiskers 48. As needed, the cap 24 may be struck with a hammer to dislodge any thin layer of concrete covering the cap 24 and the cap 24 removed. Optional wrenching surfaces (not shown) may be provided to rotate the cap 24 and help break it free from the entraining concrete. The concrete typically does not adhere that strongly to the smooth exterior sides of the skirt 42 so the cap 24 may be manually removed. Optionally, and when the location of the riser 20 permits, a pipe or tube slightly smaller in diameter than the riser 20 may be passed from the bottom side of the riser 20 to the top and force the cap 24 off the riser 20 from the bottom, up. The top plate 40 of the cap 24 is advantageously made sufficiently strong (e.g., by stiffeners 52, 54) so that cap 24 does not break and so the adhesive 56 sticks to the cap 24 and separates within the adhesive 56 and does not pull part of the riser 20 off with the adhesive 56 and thus leave a chipped or ragged end on the riser 20.

The plug 44 provides a uniform and strong internal support to the skirt 42. In this regard, the walls of the plug 44 have a uniform thickness. If the plug were absent, the concrete could press the skirt 42 inward so that when the concrete hardened, the skirt 42 did not readily separate from the concrete and break, requiring removal of part of the skirt 42 and possibly removal of concrete. The plug 44 fills the space between the skirt 42 and the riser 20, especially around the lower majority of the skirt 42, so there is no concrete entraining the lower portions of the cap 24 or skirt 42 to entrap the cap 24 and resist removal of the cap 24 from the riser 20. The slight interference fit between the plug 44 and the riser 20 helps avoid concrete entrainment. Advantageously, the bottom surface of the plug 44 is of a material or coated with a material that does not stick to the concrete and in any event, concrete is extremely weak in tension and the bottom of the plug 44 pulls away from the lower concrete surface in tension as the cap 24 moves along the axis 25 as it is withdrawn from the concrete.

The plug 44 may be fastened to the skirt 42 by adhesives. But the plug 44 preferably has a ring shape that is slightly larger than the inner diameter of the skirt 42 so that a slight interference fit between the outer periphery of the plug 44 and the inner periphery of the skirt 42 holds the plug to the skirt 42. If the top plate 40 of the cap 24 is connected to the depending skirt 42 by mating threads 60 (FIG. 5), then the top plate 40 may be removed, leaving the skirt 42 embedded in the concrete. As the plug 44 is held between the skirt 42 and riser 20 by compression of the plug 44, the plug 44 may be easily pulled out of the concrete, leaving a void space bounded on two facing lateral sides by plastic.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein. Thus, the invention is not to be limited by the illustrated embodiments.

What is claimed is:

1. An assembly for creating annular voids in concrete around a cylinder having a distal end with an outer diameter, comprising:
   a cap having a top plate with a flat top and a cylindrical skirt depending from an outer, cylindrical periphery of the top plate, the cylindrical skirt having an axial length; and
   an annular plug placed inside the cylindrical skirt and against a portion of the cylindrical skirt and extending around a circumference of the cylindrical skirt, the annular plug having a radial thickness and an axial length, the annular plug having an undeformed inner diameter to interface with the outer diameter of the cylinder;
   the annular plug having an inner cylindrical surface and an opposing outer cylindrical surface, wherein the inner and outer cylindrical surfaces are straight along the axial length of the annular plug;
   wherein the annular plug has an undeformed outer diameter to interface with an inner diameter of the cylindrical skirt.

2. The assembly of claim 1, wherein the undeformed inner diameter of the annular plug is smaller than the outer diameter of the cylinder.

3. The assembly of claim 1, wherein the undeformed outer diameter of the annular plug is larger than the inner diameter of the cylindrical skirt.

4. The assembly of claim 1, wherein the annular plug is attached to the cap with adhesive.

5. The assembly of claim 1, wherein the annular plug is made of a foam material.

6. The assembly of claim 1, wherein a bottom of the annular plug is at a bottom of the cylindrical skirt.

7. The assembly of claim 1, wherein the annular plug is a semi-rigid plastic or rubber.

8. An assembly for creating annular voids in concrete around a cylinder, comprising:
- a cap having a top plate and a cylindrical skirt depending from an outer, cylindrical periphery of the top plate, the cylindrical skirt having an axial length; and
- an annular plug placed inside the cylindrical skirt, the annular plug having an undeformed inner diameter sized to receive an outer diameter of the cylinder, and having an axial length over half the axial length of the cylindrical skirt with a bottom of the annular plug being at a bottom of the cylindrical skirt;
- the annular plug having an inner cylindrical surface and an opposing outer cylindrical surface, wherein the inner and outer cylindrical surfaces are straight along the axial length of the annular plug; and
- the annular plug having an undeformed outer diameter sized to interface with an inner diameter of the cylindrical skirt such that the annular plug is compressed when placed inside the cylindrical skirt.

9. The assembly of claim 8, wherein the undeformed inner diameter of the annular plug is smaller than the outer diameter of the cylinder.

10. The assembly of claim 8, wherein the undeformed outer diameter of the annular plug is larger than the inner diameter of the cylindrical skirt.

11. The assembly of claim 8, wherein the annular plug is attached to the cap with adhesive.

12. The assembly of claim 8, wherein the annular plug is made of a foam material.

13. The assembly of claim 8, wherein the annular plug is a semi-rigid plastic or rubber.

14. The assembly of claim 8, wherein walls of the annular plug has a uniform thickness.

15. The assembly of claim 8, wherein the annular plug is in the shape of a ring with a generally rectangular cross-section.

16. The assembly of claim 8, further comprising a plurality of flexible whiskers connected to a top of the cap and extending upward from the top of the cap.

17. The assembly of claim 8, wherein the annular plug has an axial length of 1.2 to 3 inches.

\* \* \* \* \*